United States Patent [19]

Halliwell et al.

[11] Patent Number: 5,473,772
[45] Date of Patent: Dec. 5, 1995

[54] AUTOMATIC UPDATE OF STATIC AND DYNAMIC FILES AT A REMOTE NETWORK NODE IN RESPONSE TO CALLS ISSUED BY OR FOR APPLICATION PROGRAMS

[75] Inventors: Harry Halliwell, Winchester; Matthew K. Vaughton, Romsey, both of England

[73] Assignee: International Business Machines Corporation, Armonk, N.Y.

[21] Appl. No.: 116,099

[22] Filed: Sep. 2, 1993

Related U.S. Application Data

[63] Continuation of Ser. No. 671,837, filed as PCT/GB89/00886, Aug. 3, 1989, abandoned.

[51] Int. Cl.⁶ .................................................... G06F 17/30
[52] U.S. Cl. .................. 395/650; 395/600; 395/200.03; 364/DIG. 1; 364/282.1; 364/281.3; 364/281.7; 364/282.4; 364/284; 364/286
[58] Field of Search ..................................... 395/600, 425, 395/200

[56] References Cited

U.S. PATENT DOCUMENTS

| | | | |
|---|---|---|---|
| 4,714,995 | 12/1987 | Materna et al. | 395/600 |
| 4,788,637 | 11/1988 | Tamaru | 395/200 |
| 4,853,843 | 8/1989 | Ecklund | 395/600 |
| 5,019,963 | 5/1991 | Alderson et al. | 395/600 |
| 5,239,643 | 8/1993 | Blount et al. | 395/425 |
| 5,249,293 | 9/1993 | Schreiber et al. | 395/650 |

FOREIGN PATENT DOCUMENTS

| | | |
|---|---|---|
| 0217351 | 4/1987 | European Pat. Off. . |
| 0284924 | 10/1988 | European Pat. Off. . |
| 0290828 | 11/1988 | European Pat. Off. . |

OTHER PUBLICATIONS

RCS-A System for Version Control, Walter F. Tichy, Software Practice & Experience, (Jul. 1985) vol. 15, pp. 637-654.

Primary Examiner—Thomas G. Black
Assistant Examiner—Wayne Amsbury
Attorney, Agent, or Firm—Jeffrey S. LaBaw; Wayne W. Bailey

[57] ABSTRACT

In a data processing network having a first processor (for example, a programmable workstation), a second processor (for example a host computer) and a communication system linking the first processor and the second processor, control logic associated with the first processor manages the flow of information between the first processor and the second processor on behalf of one or more application programs running on said first processor. The control logic responds too calls issued by, or on behalf of, an application invoked by a user at the first processor to determine if a file or, set of files, associated with the calling application is the most up-to-date version of the file, or set of files available. The most up-to-date versions are always stored at the second processor (i.e.: the host). A comparison is made between the files and their version levels currently available at the first processor (work station) and the up-to-date files held at the second processor (host). A list of actions to be taken is then compiled and files are downloaded to the first processor to replace out-of-date files, to add or create files in order to augment those already there, and to delete any obsolete files no longer required by the application.

22 Claims, 8 Drawing Sheets

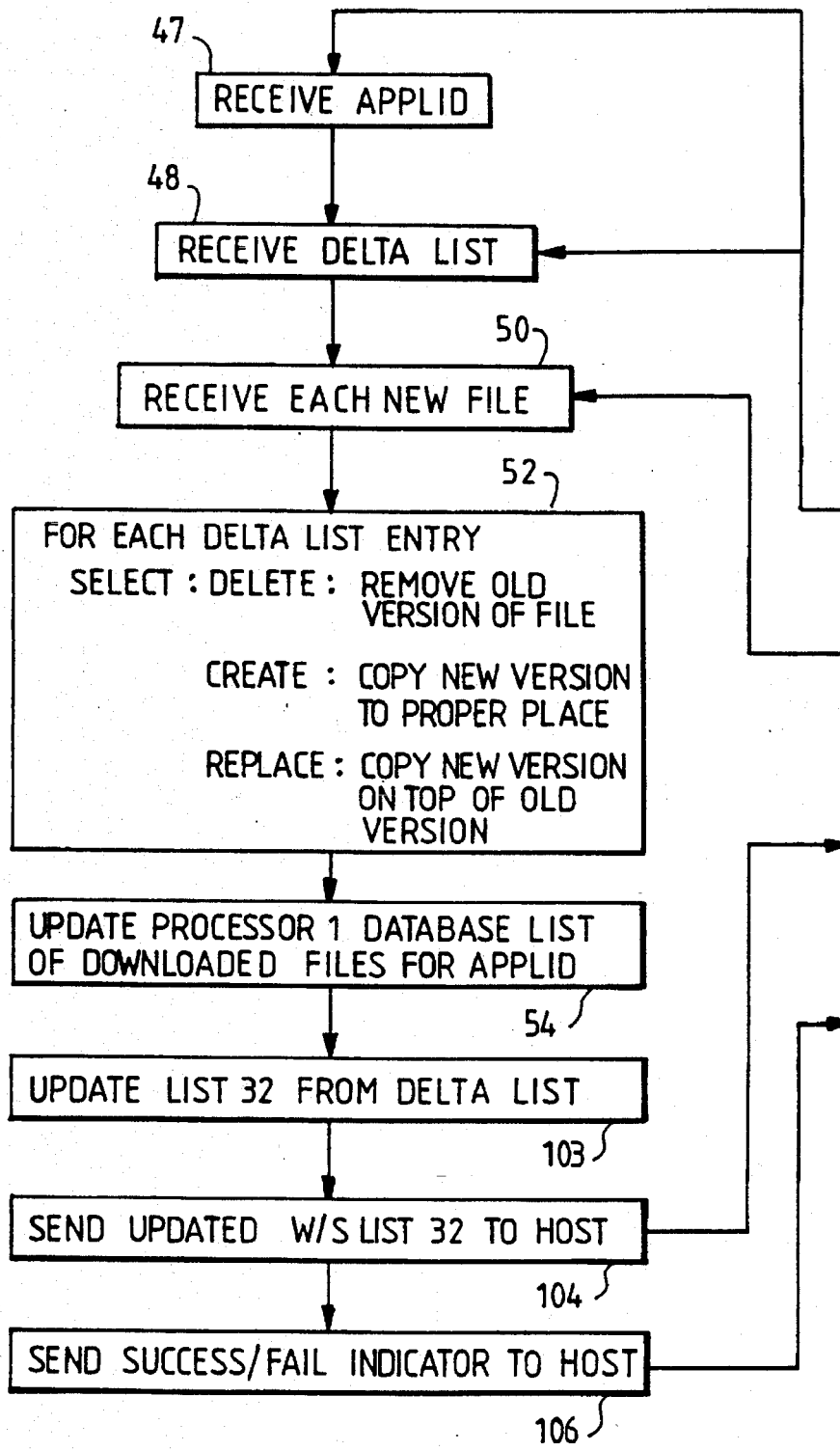

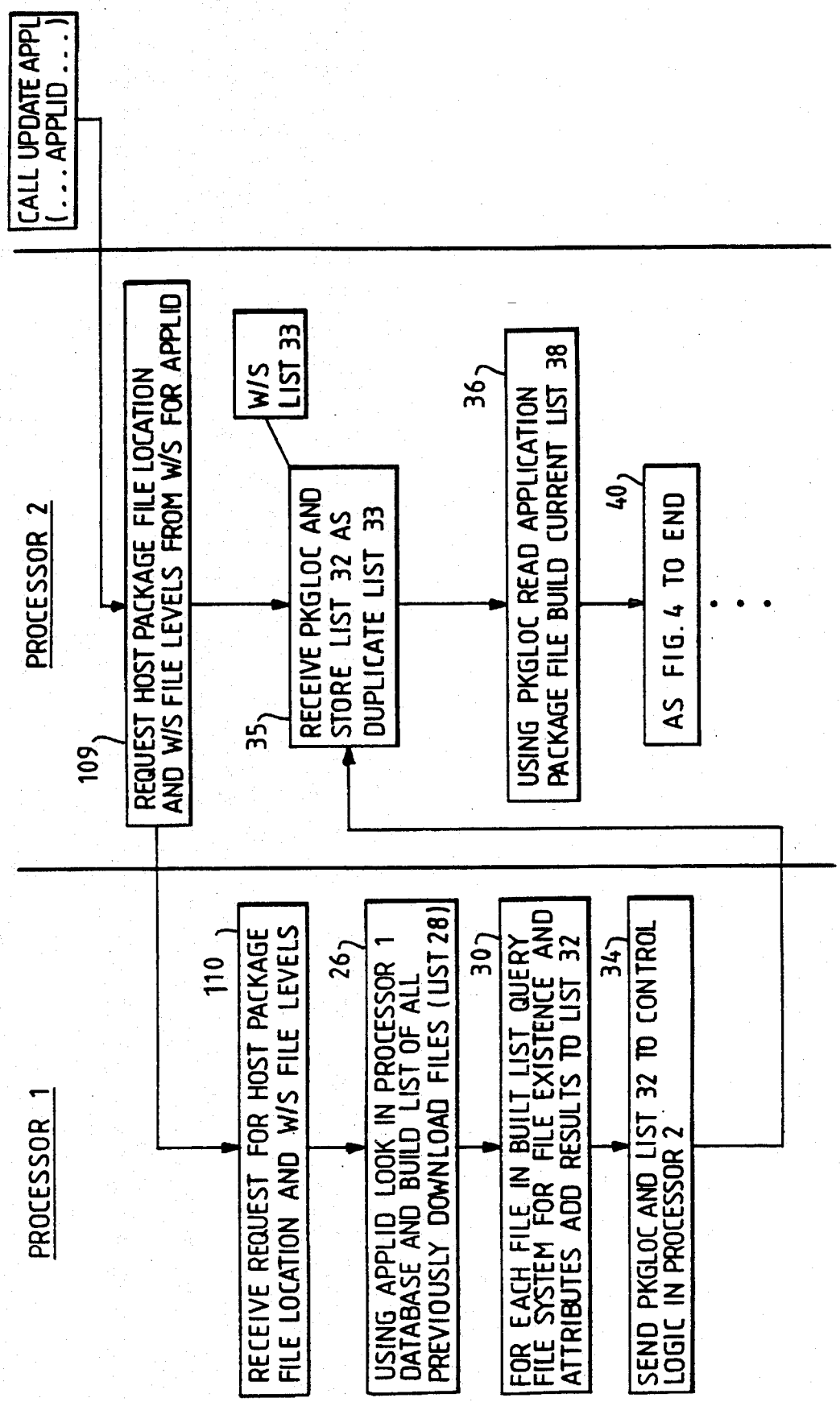

AUTOMATIC UPDATE OF STATIC AND DYNAMIC FILES AT A REMOTE NETWORK NODE IN RESPONSE TO CALLS ISSUED BY OR FOR APPLICATION PROGRAMS

This is a continuation of application Ser. No. 07/671,837 filed Apr. 2, 1991.

This application is the national phase of international application PCT/GB89/00886, having an international filing date of Aug. 3, 1989.

CROSS-REFERENCE TO RELATED APPLICATIONS

"Workstation and Data Processing Network Containing Workstations", H. Halliwell, U.S. Ser. No. 07/678,296, which is the national phase of international application PCT/GB89/00886, and having an internatinal filing date Aug. 3, 1989.

1. Technical Field of the Invention

The invention relates to the field of data processing networks. More particularly, the invention relates to data processing networks in which copies of files used by a first processor are stored on a second processor.

2. Background of the Invention

The use of data processing networks comprising many programmable workstations (such as Personal Computers) connected to one or more host mainframe computers has increased over recent years. The programmable workstations are able to carry out some data processing functions whilst other data processing functions are better suited to being carried out by the host mainframe computer. A more recent development has been the increased use of systems in which one part of a data processing function is carried out on the programmable workstation and another part of the same data processing function is carried out by the mainframe computer. This is so called distributed or co-operative processing. It is critical in such systems that both the host and workstation are at the same level of update for application programs and other types of files.

With the adoption of networks it has become possible for the host mainframe computer to be used to install and maintain application programs and data files for use in the programmable workstations. By doing this it is possible for the network to ensure that the files held at the programmable workstation are the most up to date version of those files.

It has been proposed in EP 284924 to provide a data processing network running a program on a programmable workstation wherein the program includes a portion of code for maintaining that program. When the program is started it checks to see if more up-to-date versions of its files are held by the host mainframe computer and then downloads them if necessary.

Another approach has been the provision of specific maintenance programs running on either the host or workstation which have the function of checking some or all of the files held by a workstation to see if a new version of the file should be downloaded and if necessary carrying this out. Such programs are typically either triggered to run by a user or set automatically to run periodically.

SUMMARY OF THE INVENTION

The invention provides a data processing network having a first processor, a second processor and a communication system linking the first processor and the second processor. Control logic associated with the processors is operable to manage the flow of information between the first processor and the second processor on behalf of one or more application programs running on the first processor. The control logic is responsive to calls issued by, or on behalf of, the application to determine if a file or set of files, associated with the calling application and stored by the first processor, is/are the most up-to-date version(s) of the file or set of files available for that application as stored at the second processor and, if not, to replace and/or augment the file or set of files at the first processor with the selected files downloaded from the second processor accordingly.

The invention recognises the problems associated with the prior art approaches to software maintenance and provides a solution to these problems. In the case of the system disclosed in EP 284924 the maintenance facility is only available to the particular application which has the maintenance code added to it. The benefits of that maintenance code are not therefore available to other applications running on the system. In the case of the specific stand alone maintenance programs, these lack flexibility since they must be specifically invoked and must then either follow a predetermined updating sequence or require driving by user inputs. In addition, there is no guarantee that the stand alone program will have been invoked since a given update in host level has taken place.

The present invention provides an updating facility that is available to all applications local or distributed running on the systems and has the flexibility to actually be invoked by the applications themselves as they require its services.

The manner in which this advantageous result is achieved is to provide the updating service as a facility offered by the control logic between the applications. Then in the same way that an application can issue a call, for example, to the disk operating system to recover a particular piece of data for it, so an application can issue a call to the shared control logic to determine if a file needs updating and if necessary, carry this out. It is the novel structure of providing the update facility as part of the shared control logic which is central to the present invention and which leads to the above mentioned advantages.

In preferred embodiments of the invention, when an application is started the application surrogate issues a call to the control logic to establish a communication session between the first processor and the second processor for use by the application. A description of how a surrogate application is used to establish communication between a local and a remote processor is described and claimed in our co-pending application Ser. No. 07/678,296, having an international filing data of Aug. 3, 1989. Workstation and Data Processing Network Containing Workstations (H Halliwell) IBM Docket No. UK9-89-020 of even date.

Thus, where an application resides wholly on the first processor (eg, a programmable workstation) a communication session is established between it and the second processor (eg, a host computer) in order to check that appropriate files for the application are available at the first processor and that they are at the most current level. As a result of this check, new files and updated files are downloaded to the first processor to augment and/or replace existing files as required.

Where an application is distributed between a first processor (eg programmable workstation) and a second processor (eg, a host computer), as will often be the case, the act of calling the application by a user at the workstation (say) will of itself cause the communication session to be established between the workstation and the host. Before execution proper of the application is commenced, the communication session is used in response to a call from the application surrogate to perform an update check to ensure that the correct files are available at the workstation and that they are at a level corresponding to the latest versions of the files held at the host. This is particularly important in the execution of distributed applications since exact compatibility between the separated parts of the application must be maintained to ensure the integrity of the system.

With distributed applications, the provision of this preferred feature allows the systems to avoid unnecessary delays that might be incurred in establishing an additional communication session and also avoids problems that could be encountered due to the communication system only being able to support a single communication session at any one time. Another advantage of this feature derives from the fact that only the files for the applications known to be started are checked and not all applications some of which may never be used, so that the processing overhead involved is kept to a minimum.

In particularly preferred embodiments of the invention said control logic is responsive to calls from the application issued at any point during the execution of one or more applications. With distributed applications, it is most useful to be able to issue calls during the running of the application. For example, a user request for HELP will cause the application to issue a call for the current version of the HELP panel to be downloaded from the host to the workstation. The provision of this feature allows an application a great deal more flexibility in the way it can maintain the files it needs for its execution. It will be seen that some files (static files) will be needed on every occasion that an application is executed, whereas other files (dynamic files) may only be needed on some occasions. Accordingly, the invention allows an application surrogate to issue calls (UPDATE APPL) to maintain the files its application needs every time it is executed and subsequently the application to issue other calls (PREPARE FILE) to maintain optional files as and when necessary during the application's execution. It will thus be seen that the data exchanged between the processors to carry out this update procedure for optional files will be mixed with the normal data flow between the processors resulting from execution of the application.

A preferred feature of the invention is that said first processor is adapted to delete from its storage a file for a first application in order to make room for a file being downloaded for a second application. This feature allows the first processor to manage its storage so that there is space for files being downloaded whilst the provision of the updating facility means that when the file that was deleted is next required it can be downloaded by the first application without any user intervention. It will thus be seen that there is a strong synergy between the invention and this preferred feature.

A further preferred feature of the invention is that the first processor examines the file in order to determine if said file requires updating. This feature of examining the parameters and attributes of the actual file to determine what version it is has the advantage that the invention is able to detect if the file has been altered either by accident (corruption) or deliberately (eg, a computer virus).

BRIEF DESCRIPTION OF THE DRAWING

A preferred embodiment of the invention will now be described, by way of example only, with reference to the accompanying drawings in which:

FIGS. 4A–4B is a flow diagram illustrating the data processing steps of an embodiment of the invention where a call is issued in the host to update the current application; and FIG. 5 is a flow diagram illustrating the date processing steps of an embodiment of the invention where a call is issued in the host to update an application other than the current application.

DESCRIPTION OF THE PREFERRED EMBODIMENT

Figure 1:
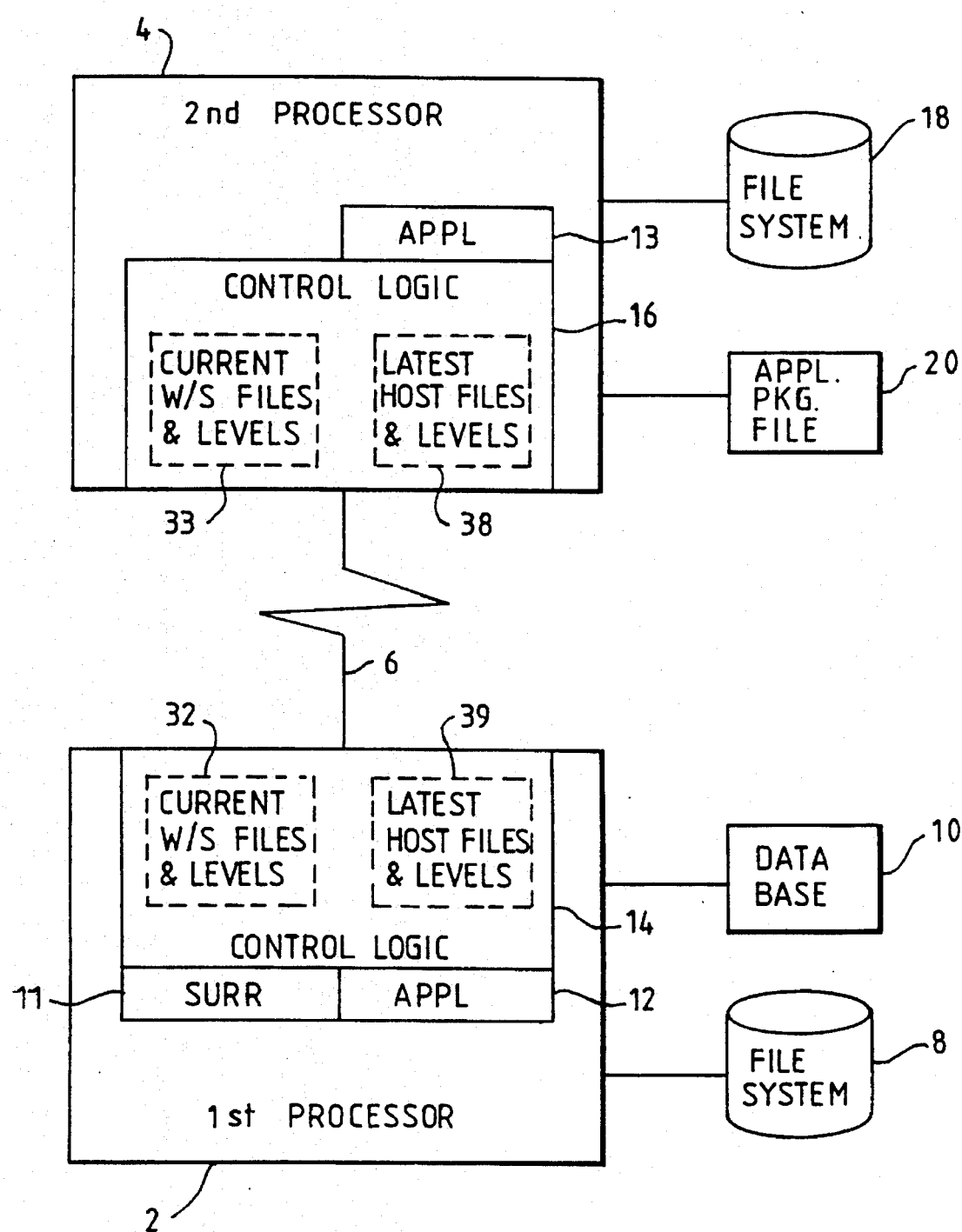
FIG. 1 schematically illustrates a data processing network embodying the invention.

FIG. 1 shows a first processor 2 (in this embodiment a programmable workstation) linked to a second processor 4 (in this embodiment a host computer) by a communication system 6. Associated with the first processor 2 is a file system 8 for storing the files held by the first processor 2. A database 10 contains a list of all the files previously downloaded to the first processor 2. An application surrogate 11 and application program 12 both run on the first processor 2 and make use of control logic 14 to manage its communication with the second processor 4.

Associated with the second processor 4 is control logic 16 for managing communication with the first processor 2. The second processor 4 also has a file system 18 storing the most up-to-date versions of all the files including those that may be required by the first processor 2 in running its applications. An application package file 20 holds a list of the files held by the second processor 4 together with attributes associated with each file such as its 'date of creation' at the host and whether it is required every time the application is run ("static file") or only sometimes the application is run ("dynamic file"). Although shown as separate components, in practice the application package file is incorporated as part of the file system. Although in the embodiment illustrated in FIG. 1, the application 12 is shown residing on the workstation, it may alternatively be on the host as application 13, or distributed between the host and the workstation as application 12 and 13 in combination. Thus, applications which demand high interaction with the user tend to be resident on the workstation, whereas applications which, for example, need to access shared data tend to be resident on the host. The dividing line between host and workstation for distributed applications is a matter for application program design.

Thus whereas an update check procedure for a local application on the workstation requires the workstation to establish a communication session with the host that otherwise would not be necessary, clearly for a remote or distributed application this step is not required because the communication session will already exist as a consequence of the user at the workstation invoking that application. In any event, once the communication session is set-up, a common procedure subject of this invention is followed regardless of whether the application to be executed is local, remote or distributed.

Setting up the communication session during application start processing involves standard data processing networking procedures and will not be described herein. The actual sequence of events is that, having established the communication session, the application starts processing, logs onto the host, and starts the host control logic 16 in conventional manner. In all the embodiments of the invention to be described hereinafter, the files at a workstation associated with an identified application are level checked by comparison with the latest versions of the files maintained at the host.

As part of this process, information concerning the files already downloaded to the workstation is compiled and held as a list 32 at the workstation and information concerning the current most up-to-date version of the files held at the host in compiled and held as another list 38 at the host.

In more detail, control logic 14 at the workstation interrogates the database 10 in order to determine which files associated with the identified application have previously been downloaded from the host to the workstation. The control logic 14 then interrogates the file system 8 to determine whether or not copies of the files are present and if so to examine their attributes to establish the 'date of creation' (ie the date assigned by the host when this file was held in the host as the most current file). The control logic uses this information to generate the list 32 of the current files believed to be associated with the identified application and their respective levels ie, whether present, and if so, their date of creation.

Similarly control logic 16 at the host reads the application package file 20 to determine what the latest host files are and their associated attributes; date of creation, static, dynamic etc. The control logic compiles this information and holds it as list 38 at the host.

The determination of whether files are at the most up-to-date current level is achieved by direct comparison of these two lists as will be seen in detail hereinafter. It is therefore useful to have copies of both lists at the workstation and at the host at all times.

Accordingly, at invocation of an application by a user the control logic compiles the two lists as described. Then, as the final part of the application start processing, the workstation file 32 is copied and sent to the host where it is held as list 33, and the host file 38 is copied and sent to the workstation where it is held as list 39. The situation at the end of this process is illustrated by the boxes in dotted outline in FIG. 1 where the workstation file information is held as lists 32 and 33 at workstation and host respectively, and the host file information is held as lists 38 and 39 at host and workstation respectively.

There are six different situations that can occur, as follows:
1. a workstation call (UPDATE APPL) for the update of the current application;
2. a workstation call (PREPARE FILE) for level checking of an optional file required during the running of an application;
3. a host call (UPDATE APPL) for the update of the current application;
4. a host call (PREPARE FILE) for level checking of an optional file required during the running of an application;
5. a workstation call for update of an application other than the current application; and
6. a host call for update of an application other than the current application.

In order to provide a thorough understanding of the invention, the more complex situation (5 above) where a workstation call is for an application other than the current application is made will be described as the first main embodiment. Thereafter, the other situations will be described making reference to this first example.

Figure 2A:
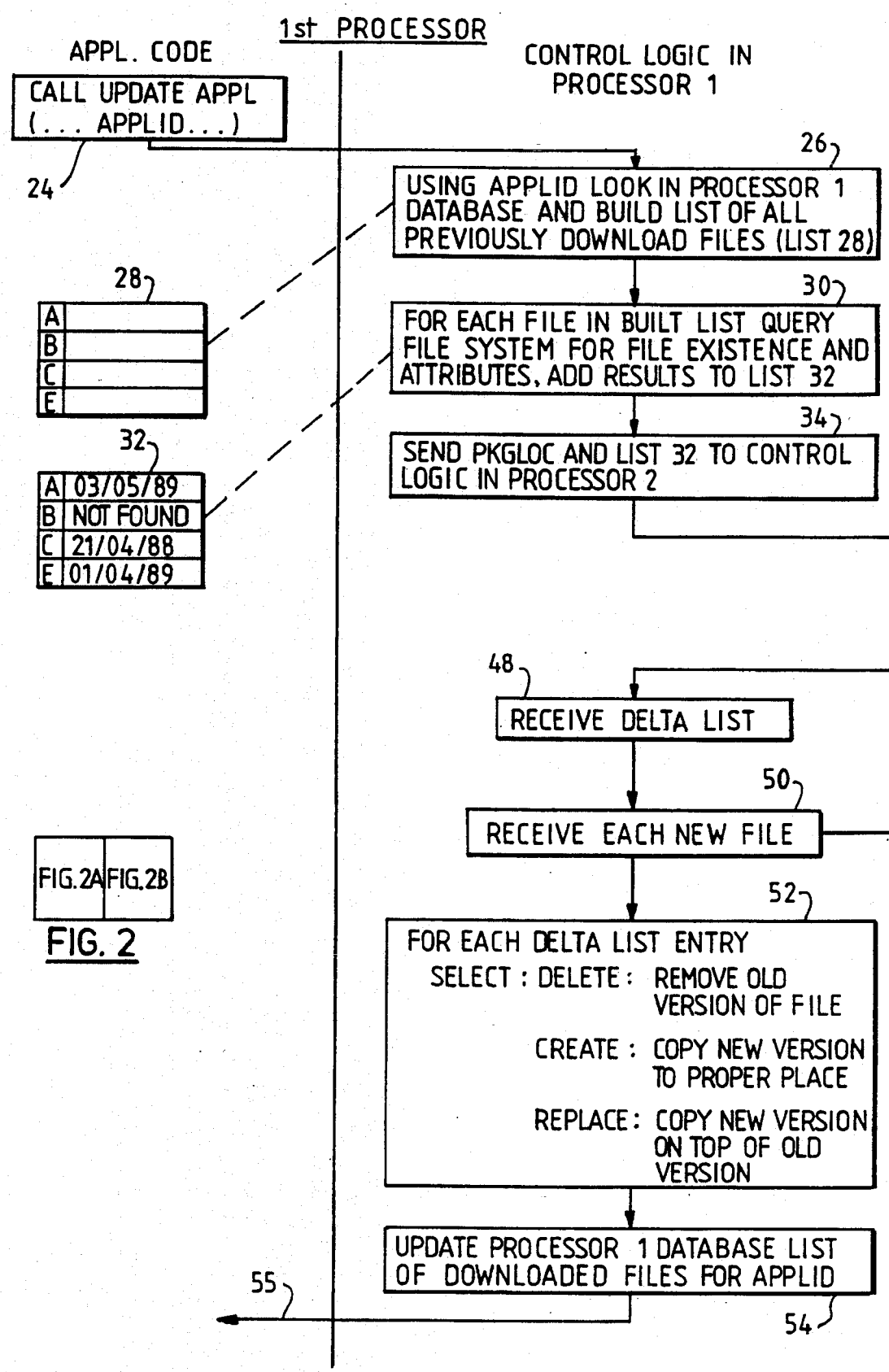
FIGS. 2A–2B is a flow diagram illustrating the data processing steps of an embodiment of the invention where a call is issued in the workstation to update an application other than the current application.
Figure 2B:
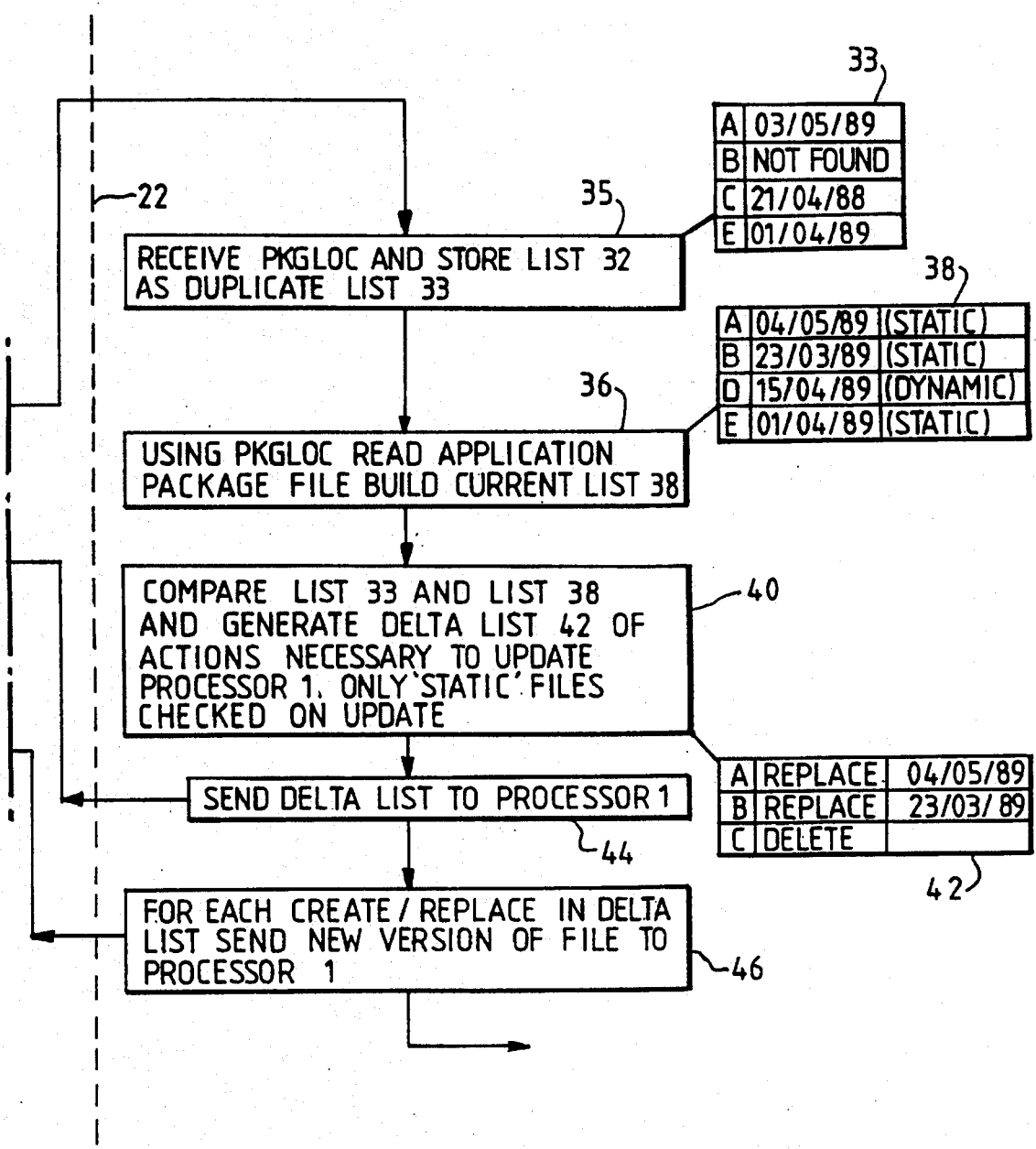

FIG. 2 (including FIGS. 2A and 2B) is a flow diagram illustrating the detailed sequence of operations to perform an update check following a call issued in the workstation to update an application other than the current application that was started. For example, an application manager application could use the function in order to manage other applications under its control. To the left of line 22 in FIG. 2 are steps carried out by the first processor 2, that is, at the workstation. To the right of line 22 are steps carried out by the second processor 4, that is, at the host.

At step 24 the application 12 issues a call (UPDATE APPL) to the associated control logic 14 to check and update the files of another application identified by a parameter (APPLID) included within the call. Control is then passed to the control logic 14. It should be understood that such a call only occurs after the current application has been started and thus its files are checked and updated using the previously compiled and stored files 32 and 39 at the workstation These in-store lists 32 and 39 are no good for updating an application which is not the current application. Instead, further lists conveying information regarding the identified application must be compiled. The control logic therefore repeats the steps described above in the compilation of lists 32 and 38, this time in respect of the called application. The original lists 32, 33, 38 and 39 belonging to the current application are not destroyed by this action.

Thus, the control logic at step 26 compiles a list 28 from the database 10 of the files previously downloaded for the identified application. This list comprises four files in this example co-labelled A, B, C and E with each label identifying the location of the respective file in the workstation in usual manner.

At step 30 the control logic 14 examines the files in the file system 8 which are on its list 28. For each file the control logic 14 queries the existence of the file in the file system 8 and the attributes of the file such as its original 'date of creation' at the host. The control logic then adds the attributes found to the list 28 to form the new list 32. Thus the updated list shows that; file A has a creation date of May 3, 1989; file B is missing from the file system (this would be the situation if the space recovery procedure referred to hereinbefore had been used); file C has a creation date of Apr. 21, 1988; and file E has a creation date of Apr. 1, 1989. At step 34 the control logic 14 sends the location address information (PKGLOC) for the application file package to the host control logic 16, and the list 32 of file information host and then waits for a reply. The address information is derived from the workstation database 10 using APPLID for the called application.

At step 35 the control logic 16 of the second processor 4 receives PKGLOC and stores the list 32 as duplicate list 33 at processor 4. At step 36 the control logic 16 uses the package file location (PKGLOC) to read the application package file 20 to find out what files processor 4 holds as current up-to-date files for the identified application together with their attributes, and compiles a new list 38.

Four file are shown to be required. File A with a creation date of May 4, 1989 is a static file, ie required every time the application is run. File B with a creation date of Mar. 23, 1989 is also a static file. File D with a creation date of Apr. 15, 1989 is a dynamic file, ie an optional file only occasionally required when the application is run. File E is another static file with a creation date of Apr. 1, 1989.

At step 40 the list 33 is compared with the list 38 to generate a "delta list" 42 of update actions that are necessary. The possible actions are REPLACE (if a more recent version of a file is held in the second processor), DELETE (if a file in list 33 is not in list 38) and CREATE (if a file is in list 38 but not list 33). In the case of an update call only static files are updated. Associated with the actions in the delta list 42 are the new attributes of the files. Thus, in the example chosen the delta list 42 contains the following:

File A flagged as a REPLACE file since it is a more recent version than that on list 32 at the workstation;

File B flagged as a REPLACE file because it is missing from the Workstation;

File C is not in the list 38 since it is an obsolete file no longer required by the application. Accordingly, File C is flagged as a DELETE file in the delta list requiring the corresponding file at the workstation to be deleted.

File D is not included in the delta list since it is a dynamic file only required on request by the application.

File E does not appear on the delta list because the file at the workstation is at the same level as that at the host as evidenced by the same creation date.

The delta file 42 is sent to the first processor 2 at step 44, followed, at step 46, by the file for each CREATE/REPLACE action taken from the file system 18.

Other files, static or dynamic, required during running the application are level checked and updated as necessary in response to a PREPARE FILE call issued by the application itself as previously mentioned.

Back in the first processor 2, the delta list 42 is received at step 48 followed, at step 50, by each of the current up-to-date downloaded files as required. At step 52 the first processor 2 uses the files sent to it to carry out the actions specified in the delta list 42, that is replacing out of date files as well as deleting files that are no longer needed. In the event that an update operation fails, for whatever reason, eg: the file is already in use, subsequent update operations are not attempted and the failure is remembered so that a pass/fail return code can be passed back to the application as indicated at 55.

In order to assist in the successful achievement of file update, the first processor 2 will additionally delete downloaded files of previous applications not in use if this is necessary to make room for the files being downloaded. It is implicit in writing a file to a file system that the system will signal back if there is not sufficient space for its purpose. Accordingly, should this occur, the control logic inspects the database 10 to see whether there are files associated with previous applications that can be deleted to provide more storage space and deletes them as required.

Finally, at step 54 the database 10 is updated with list of files from the delta list 42 before control in processor 2 is passed back to application 12 at step 55 with the pass/fail return code. In the event of a fail return code it is left to the application to determine what action it wishes to take.

Figures 3, 3A:
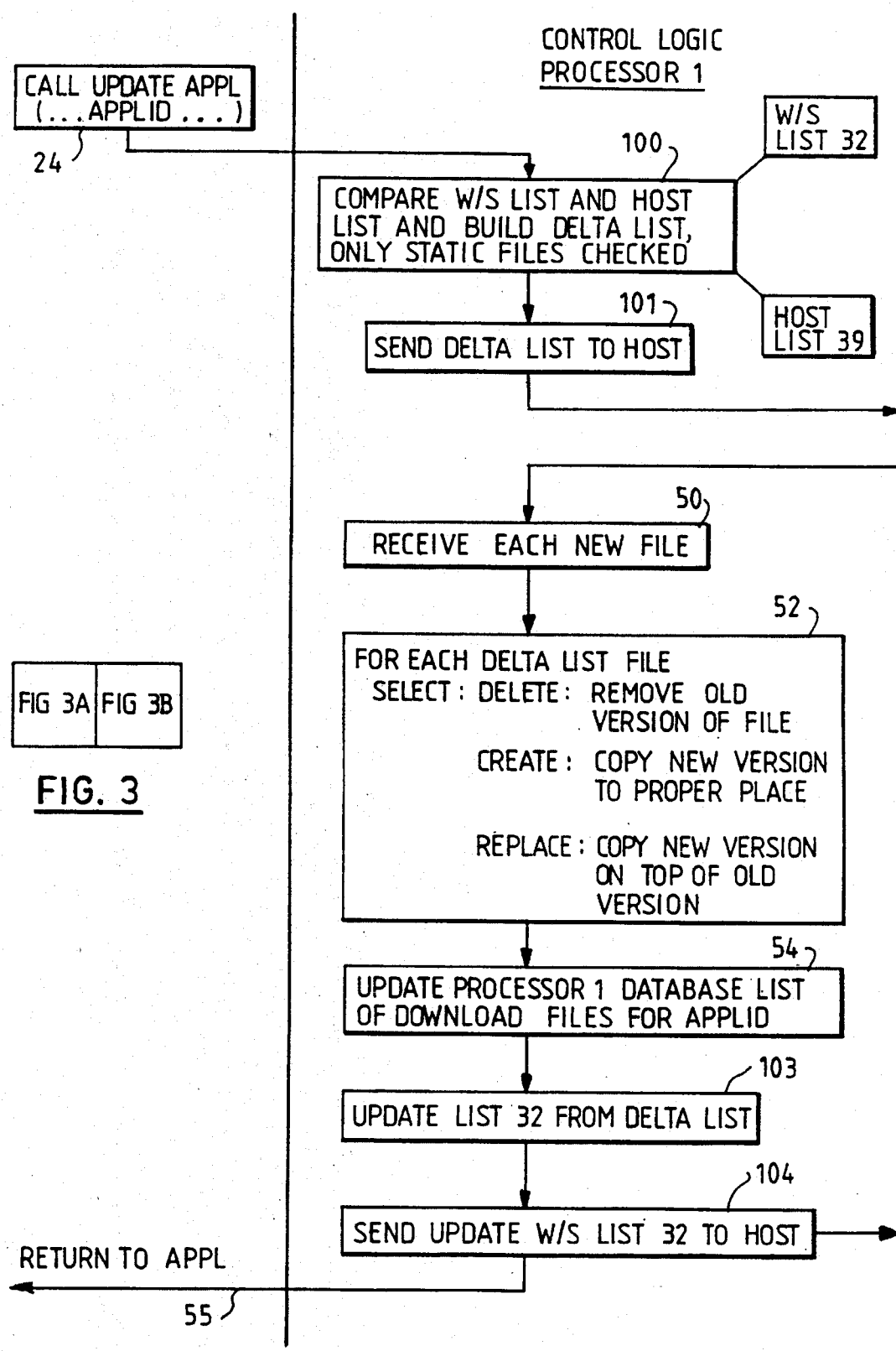
FIGS. 3A–3B is a flow diagram illustrating the data processing steps of an embodiment of the invention where a call is issued in the workstation to update the current application.
Figure 3B:
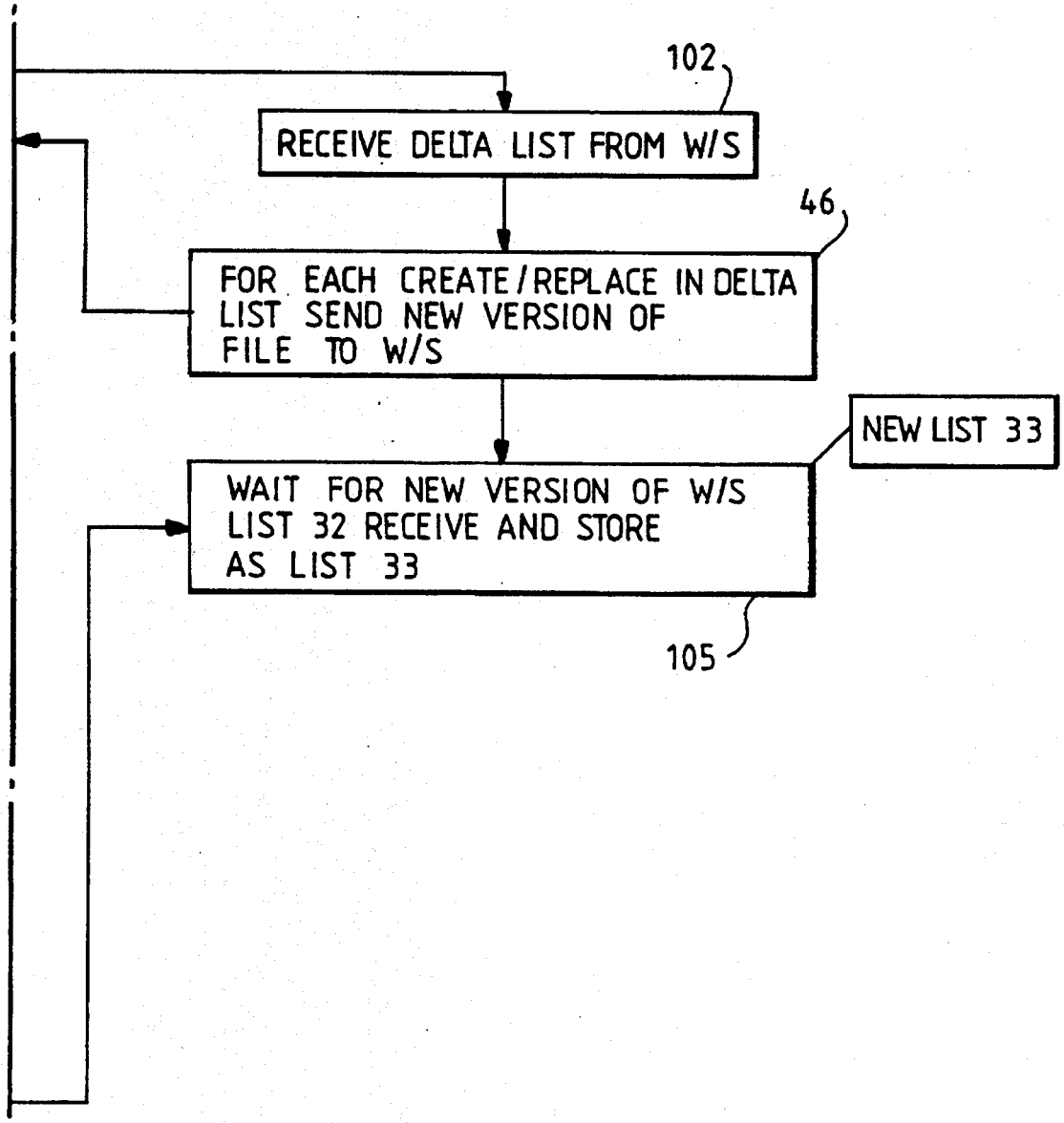

The second example describes with reference to FIG. 3 (including FIGS. 3A and 3B) the detailed sequence of operations to perform an update check following a call issued in the workstation to update the current application (situation 1 above). In this more simple situation all the information required is immediately available, held in the initially compiled and duplicated file level lists 32, 33, 38 and 39 held at each end of the link 6. This call is typically issued by a surrogate 11 to update its application files 12 before the application proper receives control.

Most of the process steps correspond to the process steps shown in FIG. 2 and the corresponding boxes in the figure have been given the same reference numbers. Only the modified and new process steps will be described.

Following the call for update, at step 100 (which is equivalent to processor 2 step 40, FIG. 2) control logic 14 in the workstation compares the current workstation file list 32 with the host file list copied and downloaded to the workstation as part of the application start processing described hereinbefore with reference to FIG. 1 and stored in the workstation as list 39. At step 101, a delta list of update actions required is generated and sent to the host. At step 102, the control logic 16 of the host receives the delta list. Steps 46, 50, 52 and 54 are exactly as described with reference to FIG. 2 and will not be repeated here. At step 103, control logic 14 of the workstation updates list 32 from the delta list and at step 104 sends the updated list 32 to the host and returns control to the application. At step 105 the host control logic receives the new version of the workstation list 32 and stores it as new list 33.

The third example describes the situation 2 above where a workstation call is issued to check the level of an optional file required by the current application. In order to obtain such a file (which may be static or dynamic) the application issues a (PREPARE FILE) call instead of the (UPDATE APPL) call in FIG. 3. This call may be issued at any stage during execution of an application and would include as a parameter the identifier (FILE ID) of the particular file for which level check is requested instead of the (APPLID) in FIG. 3. The process is essentially an optimised version of that illustrated in FIG. 3 in which both dynamic and static files may be actioned and each of the delta lists contains at most only one entry. The control logic again has all the information it requires available to it in order to respond to a PREPARE FILE call and to build its delta list.

Thus at step 24 the application issues the call (PREPARE FILE) to the control logic 16. Included as a parameter within the call is the variable (FILE ID) identifying the required file. Thus at step 40 the host control logic compares the list 33 from the workstation with the list 38 at the host and generates the single entry for delta list 42. In this example the selected file is File D, a dynamic file with a date of creation of Apr. 15, 1989. Since it was not to be found in list 32 it is flagged as a CREATE file in the delta list together with its date of creation Apr. 15, 1989. The delta list is sent to processor 2 at step 101. At step 46 processor 2 sends the requested file to processor 1 where the actual file is obtained from the file system 18. The remaining process steps are identical to that described with reference to FIG. 3.

Figure 4B:
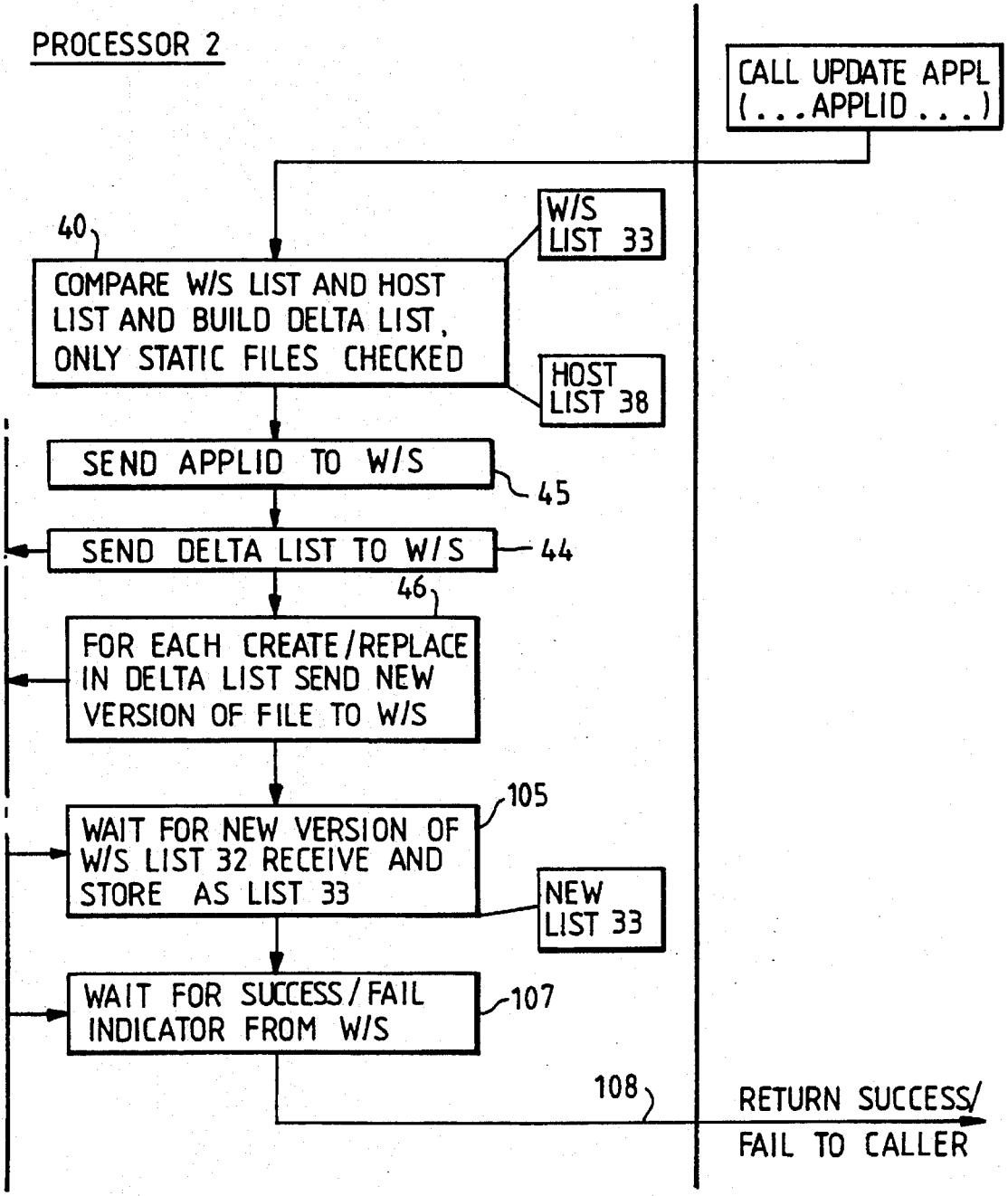

The fourth example describes the situation 3 above where a host update call is issued for current application. In practice this is not a useful call since the application will always be up-to-date by virtue of the workstation UPDATE APPL call processed at start up. However, it is included for completeness. Again many of the process steps set out in FIG. 4 are as described for the previous examples with reference to FIGS. 2 and 3. Thus steps 40, 44, 46, 48, 50, 52 and 54 as described with reference to FIG. 2. Step 103, 104, 105 are as described in FIG. 3 At step 45 the APPLID is sent to processor 1 and at step 47 processor 1 receives the APPLID. At step 106 the workstation control logic 14 sends a success/fail indicator to control logic 16. At step 107 the control logic 16 receives the success/fail indicator and passes it on to the caller at 108.

The fifth example describes the situation 4 above where a host issues a PREPARE FILE call for an operational file required by the application. This is the same as for the UPDATE APPL described with reference to FIG. 4 above with the following minor differences. A PREPARE FILE call is issued instead of an UPDATE APPL and includes the file parameter FILE ID instead of the application parameter APPLID. The other difference is that whilst building the single entry delta list a check is made for the existence of both static and dynamic files matching the FILE ID.

Situation 5 above has already been described in detail as example 1 with reference to FIG. 2.

The sixth and final example describes with reference to FIG. 5 the situation 6 above where a host issues an UPDATE APPL call for an application other than the current application. As before, many of the process steps involved are common to previous examples already described and will not be described again here. The first step 109 is a new step following the call UPDATE APPL in which the host control logic 16 requests the host package file location of the application identified by APPLID to be sent from the workstation together with a copy of the workstation file level. At step 110 the control logic 14 at the workstation receives the request for the host package file location and workstation file levels. Thereafter steps 26, 30, 34, 35 and 36 from FIG. 2 are followed. The processing steps starting at step 40 in FIG. 4 are followed to the end.

We claim:

1. A data processing network having a first processor, a second processor and a communication system linking said first processor and said second processor, wherein control logic associated with said first processor and said second processor manages information flow between said first processor and said second processor, said control logic comprising:

means for responding to calls issued by, or on behalf of, one or more application programs running on said first processor; and means responsive to the issued calls for determining which of a set of files is currently required by the one or more application programs and maintained by said first processor by classifying files in the set of files as either static files required each time the calling applications are run or dynamic files required only when particular issued calls are made, and if the currently required file is the most up-to-date version maintained at said second processor and, if not, replacing and/or augmenting the currently required file at said first processor with a selected file downloaded from said second processor.

2. A data processing network as claimed in claim 1 wherein said one or more application programs comprises a second application and a calling application and wherein the currently required file is a file required by said second application and wherein the calling application issues a call on behalf of said second application to perform an update check on the currently required file for said second application.

3. A data processing network as claimed in claim 1 wherein the control logic is distributed between the first processor and said second processor and in which update calls to check the level of files at the first processor can be initiated from the portion of the control logic at the first processor or the portion of the logic at the second processor.

4. A data processing network as claimed in claim 3 in which said control logic determines if a file stored by said first processor is current and, if not current, to download said first updated version of said file from said second processor to replace said file stored by said first processor.

5. A data processing network as claimed in claim 3 in which said control logic determines if a file in a set of files stored by said first processor is an obsolete file and if necessary to delete said obsolete file from said set of files stored by said first processor.

6. A data processing network as claimed in claim 3 in which said control logic compiles a list of current files to determine if the currently required file is the only file required by the one or more applications and, if not, to augment the currently required file by downloading one or more current files stored at said second processor and absent from the first processor as necessary.

7. A data processing network as claimed in claim 3 further comprising means for starting an application by issuing a call to said control logic to establish a communication session between said first processor and said second processor for use by said application, wherein said communication session is also used to determine if the currently required file requires replacing and/or augmenting.

8. A data processing network as claimed in claim 3 wherein said means for responding further comprises responding to calls during execution of said one or more applications for checking of a file required by said application during execution.

9. A data processing network as claimed in claim 3 wherein said first processor examines the currently required file to determine if the currently required file requires replacing and/or augmenting due to errors in the file.

10. A data processing network as claimed in claim 1 wherein said control logic further comprises means for determining if a file in the set of files stored by said first processor is an obsolete file and means for deleting, if necessary, said obsolete file from said set of files stored by said first processor.

11. A data processing network as claimed in claim 1 in which said control logic further comprises means for determining if the currently required file comprises all files required by the one or more application programs and if not to augment the the currently required file by downloading one or more additional files stored at said second processor and absent from the first processor as necessary.

12. A data processing network as claimed in claim 1 further comprising means for starting an application by issuing a call to said control logic to establish a communication session between said first processor and said second processor for use by said application, wherein said communication session is also used to determine if the currently required file requires replacing and/or augmenting.

13. A data processing network as claimed in claim 1 in which calls are issued by, or on behalf of, said one or more applications when said one or more applications are started.

14. A data processing network as claimed in claim 1 wherein said means for responding further comprises responding to calls during execution of said one or more applications for checking of a file required by said application during execution.

15. A data processing network as claimed in claim 1 wherein said first processor comprises means for deleting from its storage a file retained for a non-running application to make room for a file being downloaded for a currently running application.

16. A data processing network as claimed in claim 1 wherein said first processor examines the currently required file to determine if the currently required file one file requires replacing and/or augmenting due to errors in the file.

17. A data processing network as claimed in claim 16, in which said control logic at the first processor is operable to compile a list of files, associated with an application together with version level information for each file derived from inspection of any such files stored at the first processor, and in which said control logic at the second processor is operable to compile a list of current files, required by said application and stored as most up-to-date versions at said second processor, together with level information for each such file, and further in which said control logic is operable to compare the two lists to generate a delta list specifying actions required to update said files at said first processor, and performing those actions accordingly.

18. A data processing network as claimed in claim 17, in which a copy of the list of files compiled at the first processor is transmitted and stored at the second processor and a copy of the list of files compiled at the second processor is transmitted to and stored at the first processor.

19. A method in a data processing network having a first processor, a second processor and a communication system linking said first processor and said second processor, wherein control logic associated with said first processor and said second processor manages information flow between said first processor and said second processor, said control logic comprising:

responding to calls issued by, or on behalf of, one or more application programs running on said first processor; and responsive to the issued calls, determining which of a set of files is currently required by the one or more application programs and maintained by said first processor by classifying files in the set of files as either static files required each time the calling applications are run or dynamic files required only when particular issued calls are made, and if the currently required file is the most up-to-date version maintained at said second processor and, if not, replacing and/or augmenting the currently required file at said first processor with a selected file downloaded from said second processor.

20. A method as claimed in claim 19 wherein said one or more application programs comprises a second application and a calling application and wherein the currently required file is a file required by said second application and wherein the calling application issues a call on behalf of said second application to perform an update check on the currently required file for said second application.

21. The method as claimed in claim 19 in which calls are issued by, or on behalf of, said one or more applications when said one or more applications are started.

22. The method as claimed in claim 19, further comprising the steps of;

compiling a list of currently required files, associated with an application together with version level information for each file derived from inspection of any such files stored at the first processor, compiling a list of currently required files, required by said application and stored as most up-to-date versions together with level information for each such file at second processor;

comparing the two lists to generate a delta list specifying actions required to update said files at said first processor; and performing the specified actions.

* * * * *

UNITED STATES PATENT AND TRADEMARK OFFICE
CERTIFICATE OF CORRECTION

PATENT NO. : 5,473,772

DATED : December 5, 1995

INVENTOR(S) : Harry Halliwell and Matthew K. Vaughton

It is certified that error appears in the above-indentified patent and that said Letters Patent is hereby corrected as shown below:

On the title page, in the Abstract, line 16, after "files", insert --are--;

Column 3, line 50, delete "downloaded", insert --downloaded,--.

Signed and Sealed this

First Day of October, 1996

Attest:

BRUCE LEHMAN

Attesting Officer

Commissioner of Patents and Trademarks